US011646938B1

(12) United States Patent
 S (10) Patent No.: US 11,646,938 B1
(45) Date of Patent: May 9, 2023

(54) COMMUNICATION TYPE REGISTRY

(71) Applicant: SAP SE, Walldorf (DE)

(72) Inventor: Anbusivam S, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/893,817

(22) Filed: Aug. 23, 2022

(51) Int. Cl.
  *G06F 15/177* (2006.01)
  *H04L 41/084* (2022.01)
  *H04L 67/60* (2022.01)

(52) U.S. Cl.
  CPC ............ *H04L 41/084* (2013.01); *H04L 67/60* (2022.05)

(58) Field of Classification Search
  CPC .............................. H04L 41/084; H04L 67/60
  See application file for complete search history.

(56) References Cited

U.S. PATENT DOCUMENTS

| 8,245,273 | B2* | 8/2012 | Carr | G06F 21/6218 |
| | | | | 726/1 |
| 2005/0053091 | A1* | 3/2005 | Lee | H04L 69/22 |
| | | | | 370/522 |
| 2005/0203673 | A1* | 9/2005 | El-Hajj | G06Q 10/08 |
| | | | | 701/1 |
| 2007/0055867 | A1* | 3/2007 | Kanungo | H04L 9/3265 |
| | | | | 713/156 |
| 2015/0220576 | A1 | 8/2015 | Eberlein | |
| 2016/0012467 | A1 | 1/2016 | Nakai et al. | |
| 2017/0277698 | A1 | 9/2017 | Heard et al. | |
| 2018/0329931 | A1 | 11/2018 | Baid et al. | |
| 2021/0081193 | A1 | 3/2021 | Islam et al. | |
| 2022/0070256 | A1 | 3/2022 | Singh et al. | |

FOREIGN PATENT DOCUMENTS

CN 111835802 B * 8/2021 ......... H04L 67/1097

OTHER PUBLICATIONS

"Oracle Communications Services Gatekeeper", System Administrator's Guide, Release 6.0, E50758-03, [Online]. Retrieved from the Internet: <URL: https://docs.oracle.com/cd/E50778_01/doc.60/e50758.pdf>, (Nov. 2015), 186 pgs.

(Continued)

*Primary Examiner* — Richard G Keehn
(74) *Attorney, Agent, or Firm* — Schwegman Lundberg & Woessner, P.A.

(57) ABSTRACT

In an example embodiment, a communication type registry is introduced that stores information about various versions of various communication types permitted within a system. A communication type owner defines a new communication type with a name, version number, and version details, and registers this information with the communication type registry. All source applications and target applications that have registered with the communication type registry then get notified when there is a new communication type or new version of an existing communication type available. Optionally a central repository can be used to store updates for all the source applications and target applications, where those applications can know to look for those updates.

20 Claims, 6 Drawing Sheets

(56) References Cited

OTHER PUBLICATIONS

Driouche, Razika, et al., "Towards Ontology Lifecycle: Building, Matching and Evolution to Semantically Integrate Application Ontologies", International Journal of Computer Applications Technology and Research vol. 6, Issue 2, [Online]. Retrieved from the Internet: <URL: https://www.researchgate.net/publication/314132268>, (2017), 109-116.

Kra, Yonatan, "Handling Different Kafka Message Versions", [Online]. Retrieved from the Internet: <URL: https://yonatankra.com/handling-different-kafka-message-versions/ >, (Jun. 30, 2020), 3 pgs.

* cited by examiner

COMMUNICATION TYPE REGISTRY

TECHNICAL FIELD

This document generally relates to communications among software applications. More specifically, this document relates to version handling for communications among applications.

BACKGROUND

Communications among software applications can be accomplished in a variety of ways. Application program interfaces (APIs) are one way that communications can occur. An API is a definition of how two (or more) applications can communicate with each other, typically using requests and responses. Another way that communications can occur is via a messaging application or broker, which can utilize synchronous or asynchronous calls to accomplish the communication.

Regardless of the mechanism used for communication, each communication type carries a defined name and format, so that a source application and a destination application both understand what the communication type is going to be and what to expect. When new versions of a communication type are defined, they are typically assigned a new version number, while maintaining the same defined name.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

A technical issue arises when applications are upgraded to new versions that may use a new version of a communication type when sending or receiving messages. Specifically, after application A is upgraded to a new version using a new version of a communication type, applications that are generating messages using the communication type may not be aware that application A is using the new version of the communication type. They therefore may continue to send messages to application A using the old version of the communication type rather than the new version that the application A can handle. Additionally, in some instances those other applications may not have upgrade to the new version yet, and then may only be capable of sending messages in the old version.

Likewise, when application A wishes to send a message to another application, it does not know whether that other application is capable of handling the new version of the communication type. It may therefore wind up sending it in the old version of the communication type, just to be safe, which reduces the efficiency of the system in cases where the receiving application had, in fact, been upgraded and could have handled the communication in the new version of the communication type. Alternatively, application A may wind up sending communications in the new version of the communication type, and these messages may be unable to be processed by receiving applications that have not upgraded to the new version of the communication type yet.

These scenarios can occur quite often in microservice environments, where some of the "different" applications are, in fact, microservices of the same application. Such scenarios could be handled by designating a particular upgrade date/time, when each of the microservices are expected to have been upgraded and ready to send/receive communications in the new version of the communication type, but such a solution requires significant coordination among the microservices and imposes restrictions on when/how often upgrades can occur. Indeed, such a solution does not allow upgrades to occur at the pace a particular development team chooses, because the development team needs to wait for other development teams to be ready to upgrade before being able to deploy and use their own upgraded applications.

In an example embodiment, a communication type registry is introduced that stores information about various versions of various communication types permitted within a system. A communication type owner defines a new communication type with a name, version number, and version details, and registers this information with the communication type registry. All source applications and target applications that have registered with the communication type registry then get notified when there is a new communication type or new version of an existing communication type available. Optionally a central repository can be used to store updates for all the source applications and target applications, where those applications can know to look for those updates.

A source application can initiate a communication with a communication type version only after that communication type version has been defined by the communication type owner and registered with the communication type registry. Likewise, a target application can receive a communication with a communication type version only after that communication type version has been defined by the communication type owner and registered with the communication type registry.

The communication type version details include formatting and structural requirements of the communication type, and any other procedures or requirements (e.g., handshaking, authentication, signatures, etc.) needed to be followed when using the communication type. These details may either be directly stored in the registry, or a link to where to obtain the details may be stored in the registry and interested parties can follow the links to obtain the details.

The communication type owner is the owner of the communication type and is responsible for its lifecycle. It may be a person or entity, and may be related to a source and/or target application (e.g., an application developer), or be unrelated to the applications and be an external entity or third-party.

In addition to registering a new communication type and/or registering a new version of an existing communication type, a communication type owner may also mark, in the communication type registry, a communication type version obsolete when it is planned to be phased out, and can also delete a communication type or communication type version from the communication type registry when its lifecycle is completed (e.g., when all source applications and target applications have switched to a newer version and there is no more need to maintain the older version).

An application is a piece of software with a development lifecycle and a development team/person/entity associated with it. An application can act as a source application or a target application, as well as just a listener to the communication type registry for potential future use as a source application or target application. Each application can register for events from the communication type registry generally, but can also register itself as a source application and/or target application for a particular communication type, as well as the version(s) it supports. By supports this means that the code in the application can produce and/or consumer a message in the communication type associated with that version.

During the registration, a source application may also provide details on how the notification of changes (e.g.,, new communication types available, or new versions of existing communication types available, communication type versions marked as obsolete or deleted, and new registrations of target applications for communication types/versions. These details may include the communication channel (e.g., email, API call, etc., particular communications applications, etc.) on which the notifications will occur. Additionally, these notifications may either be handled automatically by each application, or may be handled manually by a software developer or other user. Furthermore, in an example embodiment, each application may additionally include a piece of code that handles newer versions (to initiate or receive communications) in its development lifecycle, either manually by a software developer or other user, or automatically by a software entity.

When a new communication type is introduced, code for handling the new communications type needs to be introduced into the application (such as by software developers. In some cases, it may also be possible to embed the code that handles the new version with some automated mechanisms that interprets the communication type version details from the communication type registry and adjusts itself automatically, such as by using a rule engine. Once the code is implemented by the application, the application makes a call to the communication type registry to register that it is running an application version that supports the new version of the communication type. The application version can be listed in a communication type registry configuration file defined by the communication type owner for the communication type version. This may be performed at startup or deployment of the new application version.

Prior to initiating a communication, a source application checks whether all the target applications registered for the chosen communication type support the version that the source application plans to communicate in. Initially, when a communication type is first defined, there will be only one version defined by the communication type owner and registered in the communication type registry. All the source applications and target applications can registry for only that one version. So that this stage, if a source application checks usually all the target applications will be supporting this version. However, when a new version of the communication type is introduced, all the registered applications get notified when the new communication type version is posted in the communication type registry, but there will be some delay between when the first application supports the new version of the communication type and when the last registered application supports the new version of the communication type.

During this delay, the source application should not immediately initiate communication with the new version, even though it supports it. Rather, the source application should wait until it receives notification that all registered target applications for that communication type version have indicated that they support the new communication type version.

Each registered target application can introduce its own branch of code in their application. The branch of code allows the target application to support the new version of the communication type in addition to the older version of the communication type. Once this branch of code is implemented, it then registers with the communication type registry about its ability to support the new version of the communication type.

Whenever the communication type registry receives such a registration from a target application, it notifies all the source and target applications subscribed for notifications for this communication type. It can also present the consolidated details on an explicit self-initiated call from the registered applications.

In an example embodiment, a target application cannot register for a version that is marked as obsolete. In another example embodiment, a target application can register for a version that is marked as obsolete, but a warning message is triggered. In some example embodiments, an error and rejection or warning and allow could be decided based on a configuration setting.

In an example embodiment, when a source application is still producing messages in an older version of the communication type, a target application should register for both old and new versions so that it is capable of processing both versions of the messages. If this is not done, then an error will be generated during registration.

Furthermore, in an example embodiment, a new target application cannot register only for an older version of a communication type after a source application has migrated to the new version. If this is an attempted, then an error will be generated during registration.

The call for registration to the communication type registry by the applications can be performed either during deployment as a compile-time activity, or during startup. The call for registration must be performed at least once successfully before the functionality is available for use.

A communication type owner, after reviewing information in the registry, may mark a version as deleted, either manually or automatically, so that applications can remove the code used to handle that version from their respective application codes.

In an example embodiment, the above logic, in either the source applications or the target applications (or both) could optionally be wrapped in a reusable module so that not every application needs to code it separately.

Figure 1:
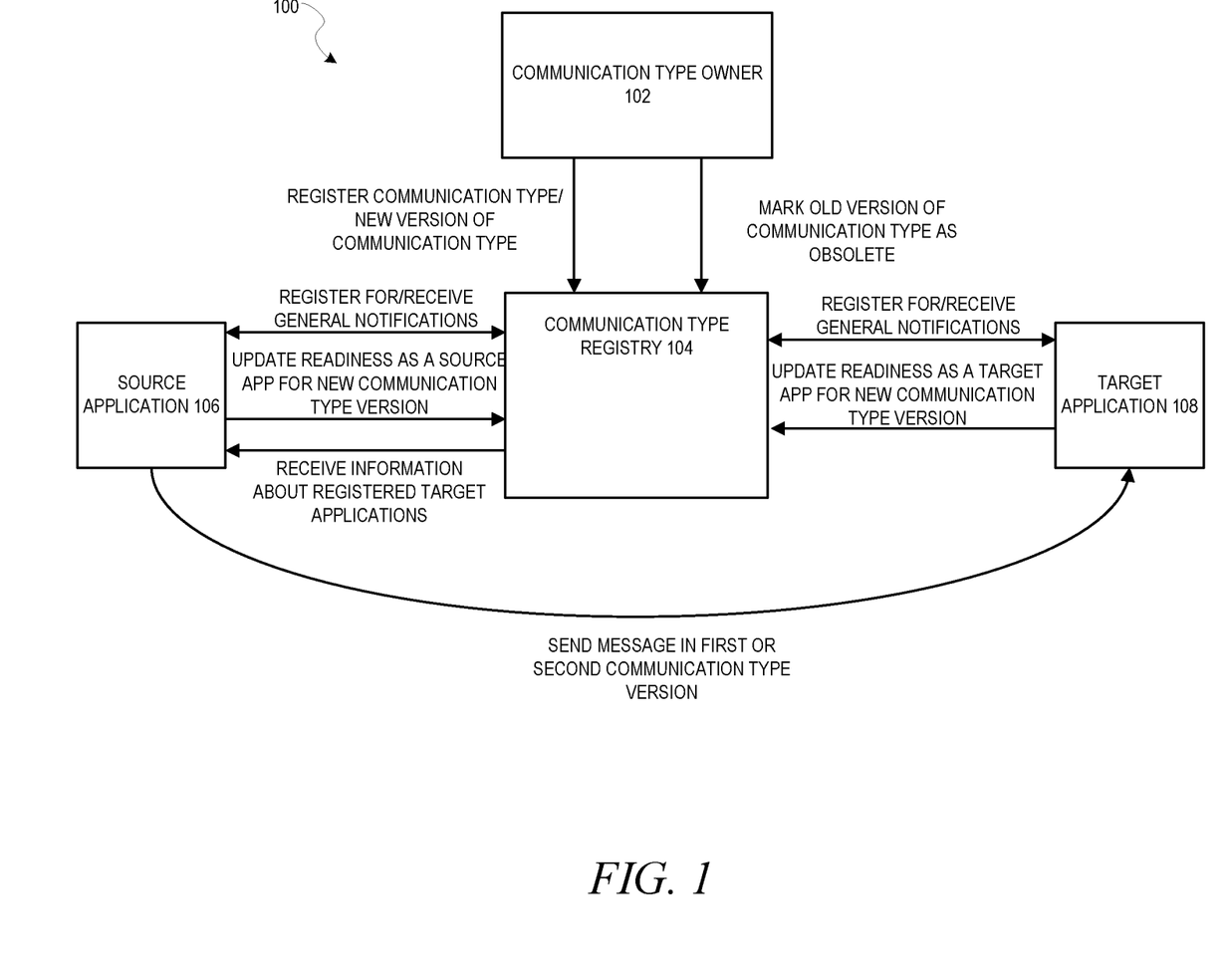
FIG. 1 is a block diagram illustrating a system for communication type version handling, in accordance with an example embodiment.

FIG. 1 is a block diagram illustrating a system 100 for communication type version handling, in accordance with an example embodiment. A communication type owner 102 creates and/or updates communication types, and publishes details about the created and/or updated communication types in communication type registry 104. The communication type owner 102 may therefore publish to the communication type registry a new communication type or a new version of an existing communication type. This publishing includes providing a communication type version signature as well as details about the communication type version, such as the format/rules of the communication type version and/or a link as to where to find the format/rules of the communication type version. The communication type owner 102 may also set a communication type version as obsolete and/or delete it.

It should also be noted that while FIG. 1 depicts only a single communication type owner 102, in reality there may be many communication type owners publishing communication types and communication type versions to the communication type registry 104.

Also depicted are a source application 106 and a target application 108. As with the communication type owner 102, only a single source application 106 and a single target application 108 are depicted, but in reality there may be many source applications 106 and many target applications 108 running in the same system 100.

Each source application 106 registers with the communication type registry 104 for general notifications. Each source application 106 may also register for specific communication type versions as a source application. Each target application 108 also registers with the communication type registry for general notifications. Each target application 108 may also register for specific communication type versions as a target application. The communication type registry stores all this information in one or more data structures, such as a table. There may be, for example, a separate table for each communication type version, which stores the details about the communication type version from the communication type owner 102 as well as the indication of which source applications 106 registered as source applications for that communication type version and an indication of which target applications 108 registered as target applications for that communication type version.

When a new communication type version is registered in the communication type registry 104, each application (source or target) that has registered for general notifications will receive a notification of the new communication type version, which then alerts the software developers of the respective applications that it is possible to upgrade their application with a new version that would support the new communication type version. When a software developer of the source application 106 creates a new version of the source application 106 that supports the new communication type version, they do so by creating a branch in the code that allows the new version of the source application 106 to also still support the old communication type version. The source application 106 then updates its readiness as a source application for the communication type version with the communication type registry and requests details from the communication type registry 104 regarding target applications that have also registered as supporting the new communication type version. When the source application 106 wishes to transmit a message to one or more target applications 108, it checks the registration information to ensure that all the recipients have registered with the communication type registry 104 as supporting the new version. If not all of the recipients have registered with the communication type registry 104 as supporting the new version, then the source application 106 sends the message using the old communication type version. If all of the recipients have registered with the communication type registry 104 as supporting the new version, then the source application 106 sends the message using the new communication type version.

It should be noted that this process of checking whether recipients have registered as being able to receive the new communication type version can be implemented in a number of different ways. In one example embodiment, the source application 106 makes a call to the communication type registry 104 each time a message is to be sent to one or more target applications 108, thus receiving the most up-to-date information about whether the one or more target applications 108 can receive the message in the new communication type version or not. This, however, may add bandwidth congestion between the source application 106 and the communication type registry 104 and may slow down the message sending process. Thus, in some example embodiments, a periodic call is made from the source application 106 to the communication type registry 104 to request all the target applications registered as being able to receive a message in the new communication type version, and the source application 106 can store this information locally, which can then be checked against a recipient list to determine more quickly whether the recipients can receive a message in the new communication type version, at least as of the time of the last periodic call.

Thus, once a source application 106 has determined that all recipient target applications 108 are capable of processing messages in the new communication type version, it may transmit messages directly to the one or more target applications 108. Otherwise, it may continue to transmit messages directly in the old communication type version until such time that all recipient target applications 108 are capable of processing messages in the new communication type version.

Figure 2:
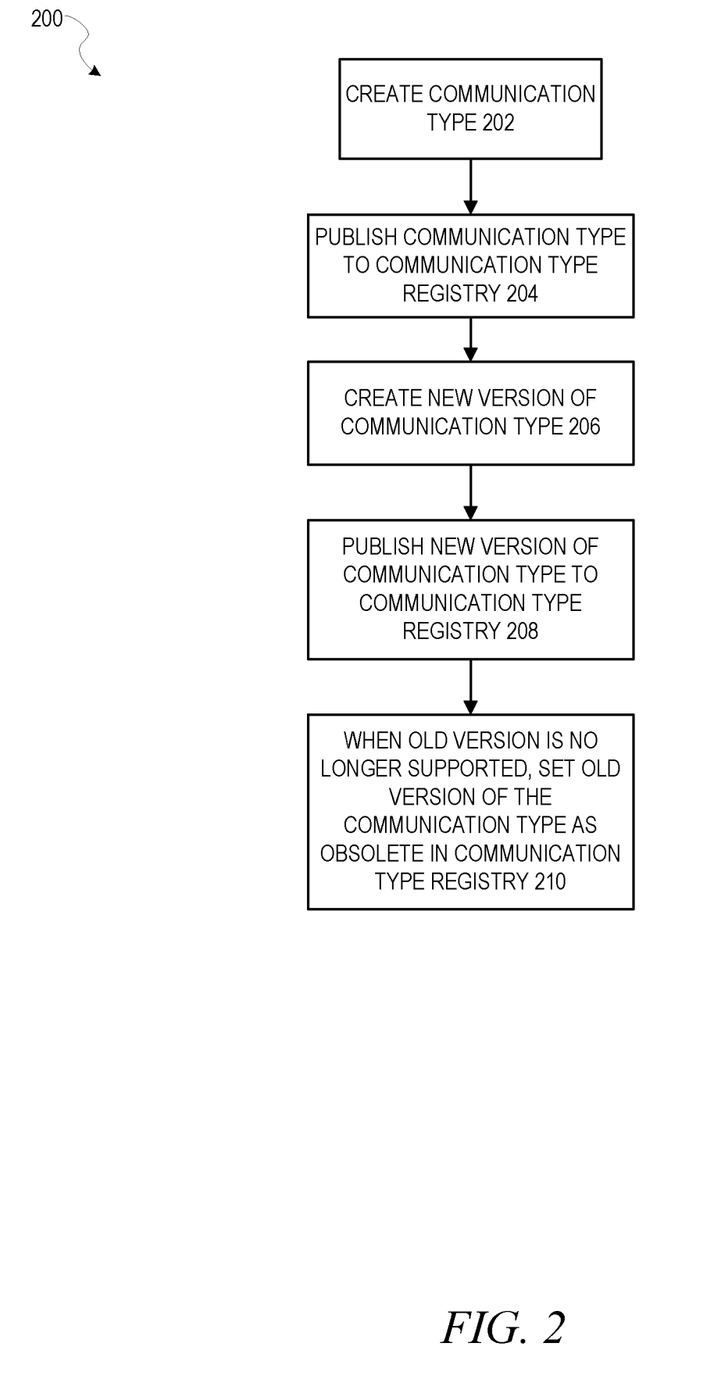
FIG. 2 is a flow diagram illustrating a method for a communication type owner to deploy a new communication type, in accordance with an example embodiment.

FIG. 2 is a flow diagram illustrating a method 200 for a communication type owner to deploy a new communication type, in accordance with an example embodiment. At operation 202, the communication type owner creates a communication type. At operation 204, the communication type owner publishes the new communication type to a communication type registry. This may include, as described earlier, publishing a communication type signature, a version identification, and details about the communication type (such as format/rules for implementing or a link as to where such format/rules can be found) in the communication type registry. At operation 206, the communication type owner creates a new version of the communication type. At operation 208, the communication type owner publishes the new version of the communication type to the communication type registry. Once the old version is no longer supported, at operation 210 the communication type owner sets the old version of the communication type as obsolete in the communication type registry.

Figure 3:
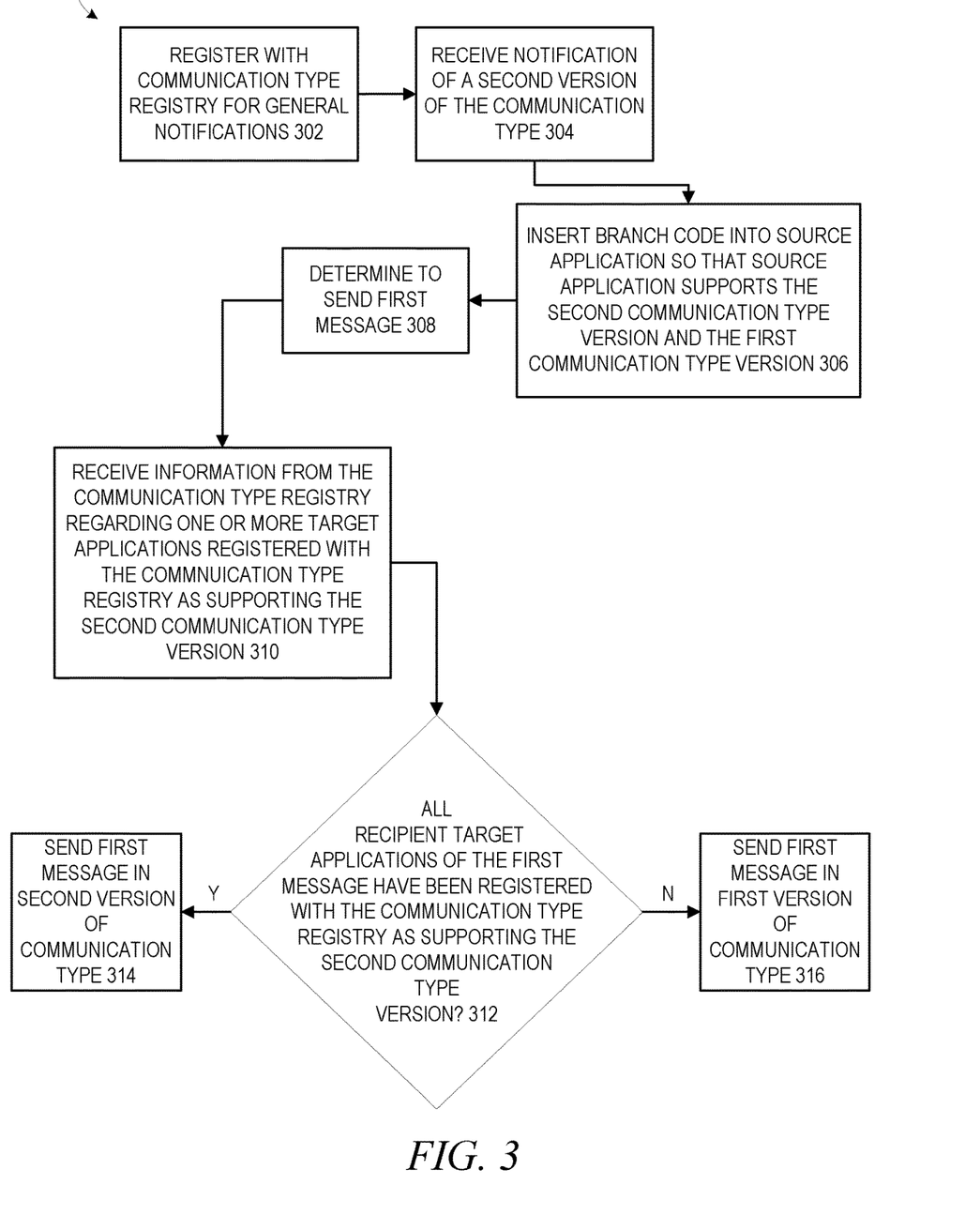
FIG. 3 is a flow diagram illustrating a method for a source application to utilize a communication type registry, in accordance with an example embodiment.

FIG. 3 is a flow diagram illustrating a method 300 for a source application to utilize a communication type registry, in accordance with an example embodiment. The source application may support a first version of a communication type. At operation 302, the source application registers with the communication type registry for general notifications. At operation 304, the source application receives a notification from the communication type registry of a second version of the communication type utilized by the source application. The second version is a newer version than the first version. At operation 306, branch code is inserted into the source application so that the source application supports the second communication type version while still supporting the first communication type version.

At operation 308, the source application determines that it needs to send a first message. At operation 310, information is received from the communication type registry regarding one or more target applications registered with the communication type registry as supporting the second version of the communication type. It should be noted that, as described earlier, embodiments are possible where operation 310 takes place prior to operation 308.

At operation 312, the source application determines whether all recipient target applications of the first message have been registered with the communication type registry as supporting the second version of the communication type. If so, then at operation 314 the first message is generated and sent in the second version of the communication type. If not, then at operation 316 the first message is generated and sent in the first version of the communication type.

While not pictured here, in an alternative embodiment, the source application determines not just whether all recipient target applications of a particular message have registered with the communication type registry as supporting the second version of the communication type, but whether all target applications that have registered for any version of the communication type have been registered as supporting the second version. In such a case, the source application may then additionally inform the registry that it will now send all communications that use the communication type in the new version of the communication type.

Figure 4:
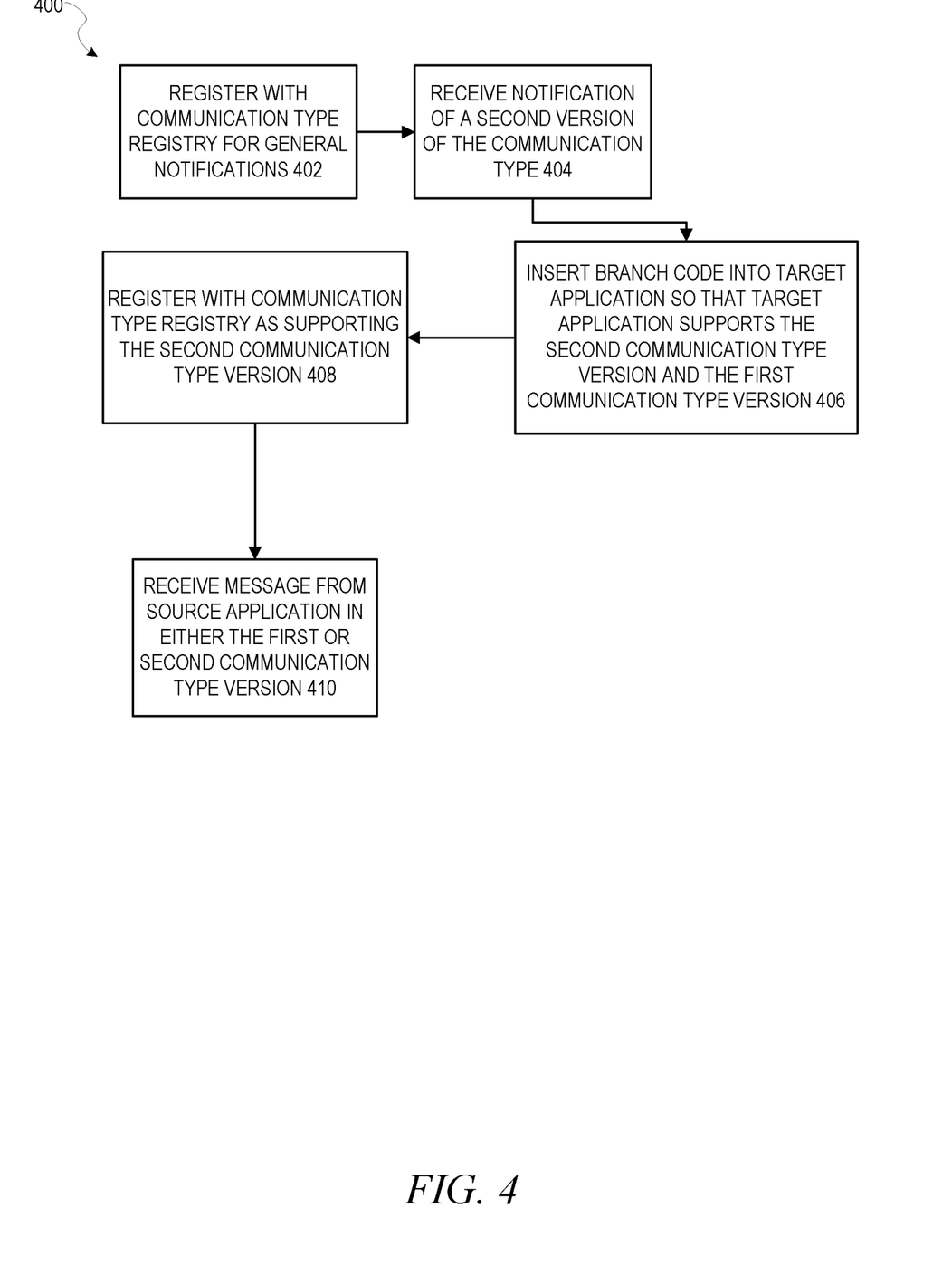
FIG. 4 is a flow diagram illustrating a method for a target application to utilize a communication type registry, in accordance with an example embodiment.

FIG. 4 is a flow diagram illustrating a method 400 for a target application to utilize a communication type registry, in accordance with an example embodiment. The target application may support a first version of a communication type. At operation 402, the target application registers with the communication type registry for general notifications. At operation 404, the source application receives a notification from the communication type registry of a second version of the communication type utilized by the target application. The second version is a newer version than the first version. At operation 406, branch code is inserted into the target application so that the target application supports the second communication type version while still supporting the first communication type version. At operation 408, the target application registers with the communication type registry as supporting the second version of the communication type. Finally at operation 410, the target application receives a message from a source application in either the first or second version of the communication type (depending upon whether all recipient target applications of the message have registered with the communication type registry as supporting the second version of the communication type. Due to the branch code, the target application is able to process the message regardless of whether it is in the first version of the communication type or the second version of the communication type.

In view of the disclosure above, various examples are set forth below. It should be noted that one or more features of an example, taken in isolation or combination, should be considered within the disclosure of this application.

Example 1. A system comprising:
 at least one hardware processor; and
 a computer-readable medium storing instructions that, when executed by the at least one hardware processor, cause the at least one hardware processor to perform operations comprising, at a source application supporting a first version of a communication type:
  receiving a notification from a communication type registry of a second version of the communication type;
  inserting branch code into the source application so that the source application supports the second version of the communication type in addition to supporting the first version of the communication type;
  determining that a first message needs to be sent;
  based on the determination and based on information received from the communication type registry, determining whether all of one or more recipient target applications of the first message have registered with the communication type registry as supporting the second version of the communication type; and
  in response a determination that all of the one or more recipient target applications of the first message have registered with the communication type registry as supporting the second version of the communication type, generating and sending the first message to all of the one or more recipient target applications in the second version of the communication type.

Example 2. The system of Example 1, wherein the operations further comprise:
 determining that a second message needs to be sent;
 based on the determination that the second message needs to be sent and based on information received from the communication type registry, determining whether all of one or more recipient target applications of the second message have registered with the communication type registry as supporting the second version of the communication type; and
 in response a determination that not all of the one or more recipient target applications of the second message have registered with the communication type registry as supporting the second version of the communication type, generating and sending the first message to all of the one or more recipient target applications in the first version of the communication type.

Example 3. The system of Example 1 or 2, wherein the information received from the communication type registry used in the determining whether all of one or more recipient target applications of the first message have registered with the communication type registry as supporting the second version of the communication type is obtained on a periodic basis by the source application.

Example 4. The system of any of Examples 1-3, wherein the information received from the communication type registry used in the determining whether all of one or more recipient target applications of the first message have registered with the communication type registry as supporting the second version of the communication type is obtained after the determination that the first message needs to be sent.

Example 5. The system of any of Examples 1-4, wherein the branch code is generated based on information about the second version of the communication type obtained from the communication type registry.

Example 6. The system of Example 5, wherein the information about the second version of the communication type obtained from the communication type registry includes details of a format for the second version of the communication type and rules for implementing the second version of the communication type.

Example 7. The system of Example 6, wherein the format and rules are obtained via a link posted by a communication owner of the communication type in the communication type registry.

Example 8. A method comprising:
receiving a notification from a communication type registry of a second version of the communication type;
inserting branch code into the source application so that the source application supports the second version of the communication type in addition to supporting the first version of the communication type;
determining that a first message needs to be sent;
based on the determination and based on information received from the communication type registry, determining whether all of one or more recipient target applications of the first message have registered with the communication type registry as supporting the second version of the communication type; and
in response a determination that all of the one or more recipient target applications of the first message have registered with the communication type registry as supporting the second version of the communication type, generating and sending the first message to all of the one or more recipient target applications in the second version of the communication type.

Example 9. The method of Example 8, further comprising
determining that a second message needs to be sent;
based on the determination that the second message needs to be sent and based on information received from the communication type registry, determining whether all of one or more recipient target applications of the second message have registered with the communication type registry as supporting the second version of the communication type; and
in response a determination that not all of the one or more recipient target applications of the second message have registered with the communication type registry as supporting the second version of the communication type, generating and sending the first message to all of the one or more recipient target applications in the first version of the communication type.

Example 10. The method of Example 8 or 9, wherein the information received from the communication type registry used in the determining whether all of one or more recipient target applications of the first message have registered with the communication type registry as supporting the second version of the communication type is obtained on a periodic basis by the source application.

Example 11. The method of any of Examples 8-10, wherein the information received from the communication type registry used in the determining whether all of one or more recipient target applications of the first message have registered with the communication type registry as supporting the second version of the communication type is obtained after the determination that the first message needs to be sent.

Example 12. The method of any of Examples 8-11, wherein the branch code is generated based on information about the second version of the communication type obtained from the communication type registry.

Example 13. The method of Example 12, wherein the information about the second version of the communication type obtained from the communication type registry includes details of a format for the second version of the communication type and rules for implementing the second version of the communication type.

Example 14. The method of Example 13, wherein the format and rules are obtained via a link posted by a communication owner of the communication type in the communication type registry.

Example 15. A non-transitory machine-readable medium storing instructions which, when executed by one or more processors, cause the one or more processors to perform operations comprising:
receiving a notification from a communication type registry of a second version of the communication type;
inserting branch code into the source application so that the source application supports the second version of the communication type in addition to supporting the first version of the communication type;
determining that a first message needs to be sent;
based on the determination and based on information received from the communication type registry, determining whether all of one or more recipient target applications of the first message have registered with the communication type registry as supporting the second version of the communication type; and
in response a determination that all of the one or more recipient target applications of the first message have registered with the communication type registry as supporting the second version of the communication type, generating and sending the first message to all of the one or more recipient target applications in the second version of the communication type.

Example 16. The non-transitory machine-readable medium of Example 15, wherein the operations further comprise:
determining that a second message needs to be sent;
based on the determination that the second message needs to be sent and based on information received from the communication type registry, determining whether all of one or more recipient target applications of the second message have registered with the communication type registry as supporting the second version of the communication type; and
in response a determination that not all of the one or more recipient target applications of the second message have registered with the communication type registry as supporting the second version of the communication type, generating and sending the first message to all of the one or more recipient target applications in the first version of the communication type.

Example 17. The non-transitory machine-readable medium of Example 15 or 16, wherein the information received from the communication type registry used in the determining whether all of one or more recipient target applications of the first message have registered with the communication type registry as supporting the second version of the communication type is obtained on a periodic basis by the source application.

Example 18. The non-transitory machine-readable medium of any of Examples 15-17, wherein the information received from the communication type registry used in the determining whether all of one or more recipient target applications of the first message have registered with the communication type registry as supporting the second version of the communication type is obtained after the determination that the first message needs to be sent.

Example 19. The non-transitory machine-readable medium of any of Examples 15-18, wherein the branch code is generated based on information about the second version of the communication type obtained from the communication type registry.

Example 20. The non-transitory machine-readable medium of Example 19, wherein the information about the second version of the communication type obtained from the communication type registry includes details of a format for the second version of the communication type and rules for implementing the second version of the communication type.

Figure 5:
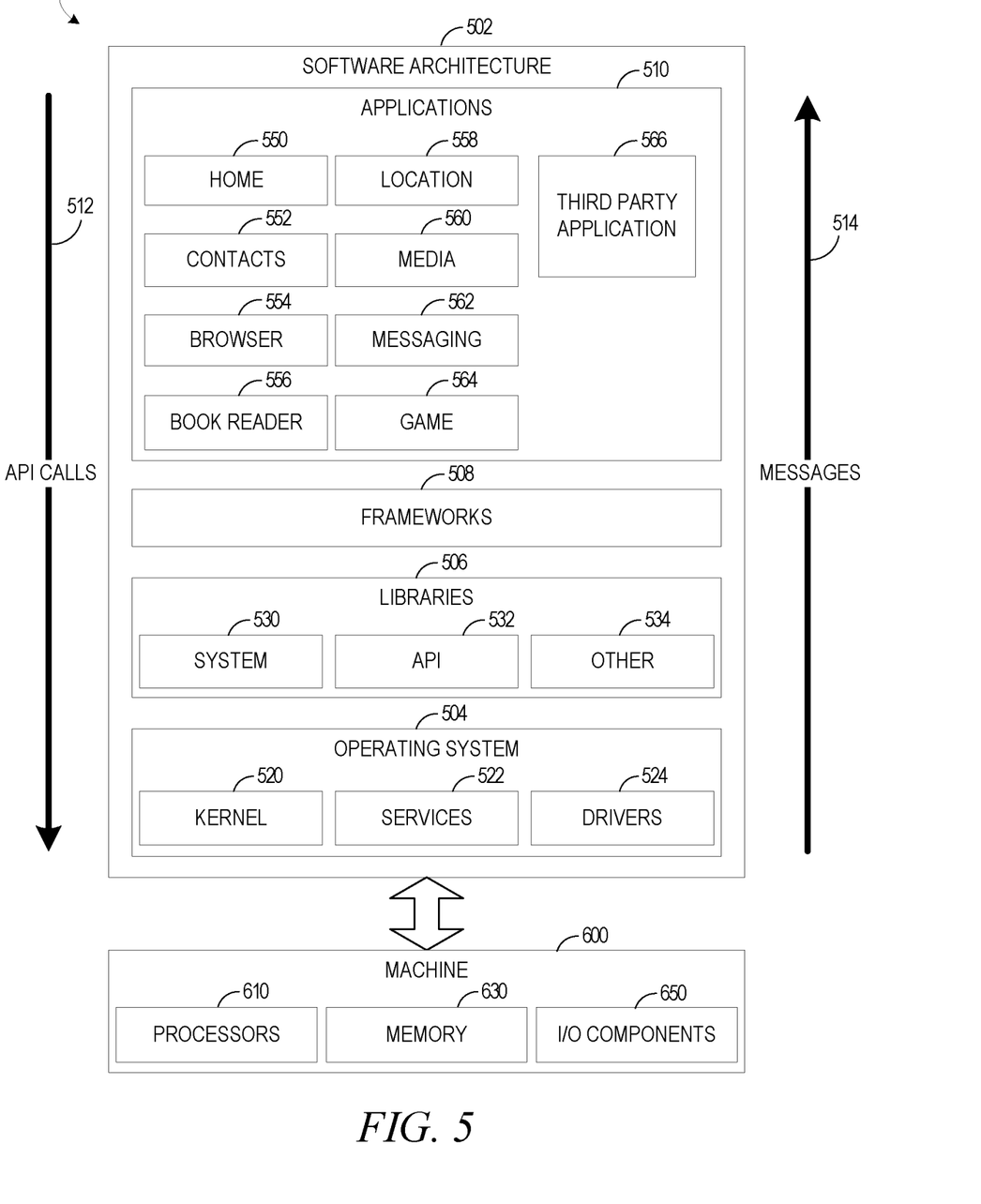
FIG. 5 is a block diagram illustrating an architecture of software, which can be installed on any one or more of the devices described above.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphical user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
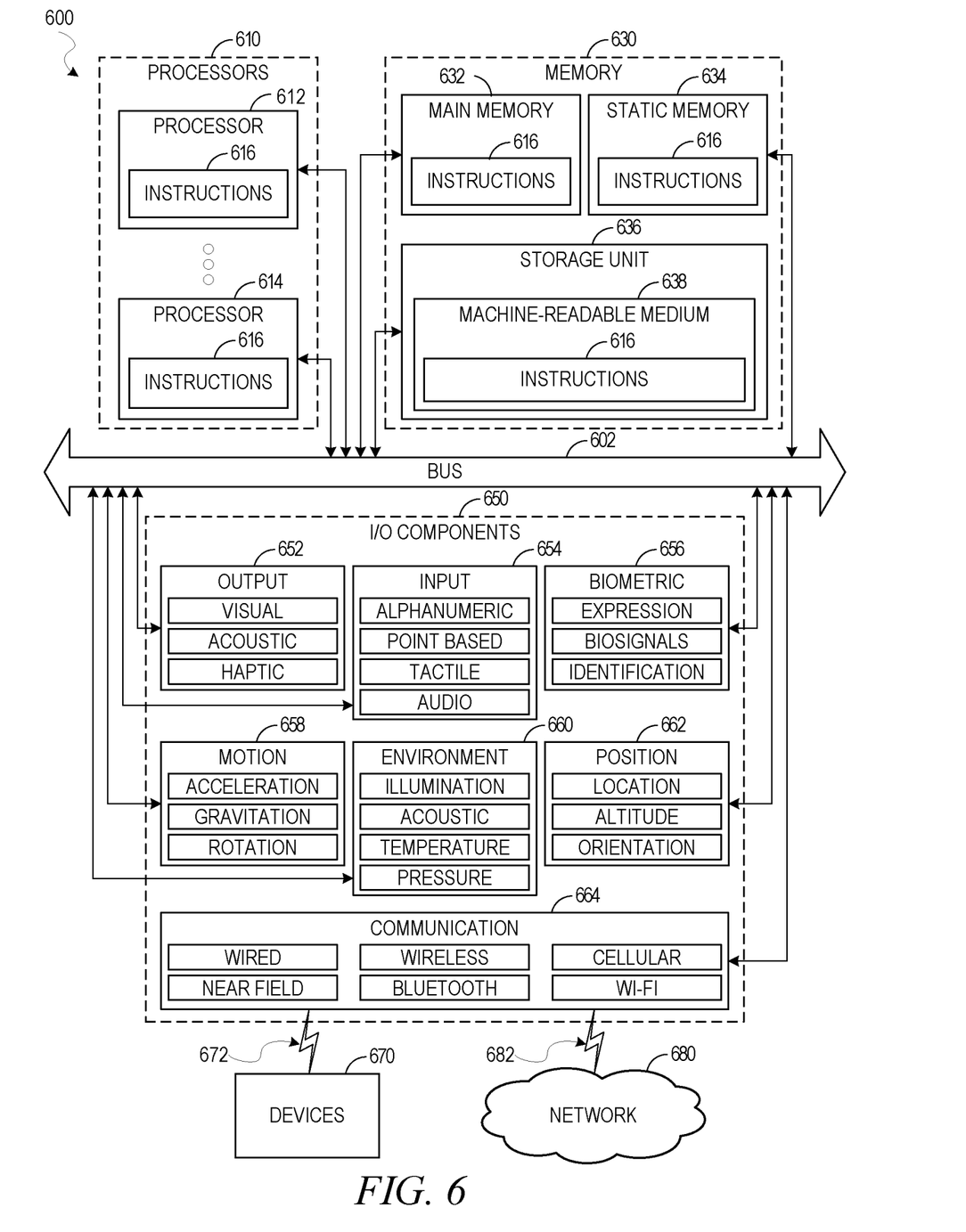
FIG. 6 illustrates a diagrammatic representation of a machine in the form of a computer system within which a set of instructions may be executed for causing the machine to perform any one or more of the methodologies discussed herein, according to an example embodiment.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the methods of FIG. 4. Additionally, or alternatively, the instructions 616 may implement FIGS. 1-4 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a non-transitory computer-readable medium storing instructions that, when executed by the at least one hardware processor, cause the at least one hardware processor to perform operations comprising, at a source application supporting a first version of a communication type:
   receiving a notification from a communication type registry of a second version of the communication type;
   inserting branch code into the source application so that the source application supports the second version of the communication type in addition to supporting the first version of the communication type;
   determining that a first message needs to be sent;
   based on the determination and based on information received from the communication type registry, determining whether all of one or more recipient target applications of the first message have registered with the communication type registry as supporting the second version of the communication type; and
   in response a determination that all of the one or more recipient target applications of the first message have registered with the communication type registry as supporting the second version of the communication type, generating and sending the first message to all of the one or more recipient target applications in the second version of the communication type.

2. The system of claim 1, wherein the operations further comprise:
   determining that a second message needs to be sent;
   based on the determination that the second message needs to be sent and based on information received from the communication type registry, determining whether all of one or more recipient target applications of the second message have registered with the communication type registry as supporting the second version of the communication type; and
   in response a determination that not all of the one or more recipient target applications of the second message have registered with the communication type registry as supporting the second version of the communication type, generating and sending the first message to all of the one or more recipient target applications in the first version of the communication type.

3. The system of claim 1, wherein the information received from the communication type registry used in the determining whether all of one or more recipient target applications of the first message have registered with the communication type registry as supporting the second version of the communication type is obtained on a periodic basis by the source application.

4. The system of claim 1, wherein the information received from the communication type registry used in the determining whether all of one or more recipient target applications of the first message have registered with the communication type registry as supporting the second version of the communication type is obtained after the determination that the first message needs to be sent.

5. The system of claim 1, wherein the branch code is generated based on information about the second version of the communication type obtained from the communication type registry.

6. The system of claim 5, wherein the information about the second version of the communication type obtained from the communication type registry includes details of a format for the second version of the communication type and rules for implementing the second version of the communication type.

7. The system of claim 6, wherein the format and rules are obtained via a link posted by a communication owner of the communication type in the communication type registry.

8. A method comprising:
   receiving, at a source application supporting a first version of a communication type, a notification from a communication type registry of a second version of the communication type;
   inserting branch code into the source application so that the source application supports the second version of the communication type in addition to supporting the first version of the communication type;
   determining that a first message needs to be sent;
   based on the determination and based on information received from the communication type registry, determining whether all of one or more recipient target applications of the first message have registered with the communication type registry as supporting the second version of the communication type; and
   in response a determination that all of the one or more recipient target applications of the first message have registered with the communication type registry as supporting the second version of the communication type, generating and sending the first message to all of the one or more recipient target applications in the second version of the communication type.

9. The method of claim 8, further comprising
   determining that a second message needs to be sent;
   based on the determination that the second message needs to be sent and based on information received from the communication type registry, determining whether all of one or more recipient target applications of the second message have registered with the communication type registry as supporting the second version of the communication type; and
   in response a determination that not all of the one or more recipient target applications of the second message have registered with the communication type registry as supporting the second version of the communication type, generating and sending the first message to all of the one or more recipient target applications in the first version of the communication type.

10. The method of claim 8, wherein the information received from the communication type registry used in the determining whether all of one or more recipient target applications of the first message have registered with the communication type registry as supporting the second version of the communication type is obtained on a periodic basis by the source application.

11. The method of claim 8, wherein the information received from the communication type registry used in the determining whether all of one or more recipient target applications of the first message have registered with the communication type registry as supporting the second version of the communication type is obtained after the determination that the first message needs to be sent.

12. The method of claim 8, wherein the branch code is generated based on information about the second version of the communication type obtained from the communication type registry.

13. The method of claim 12, wherein the information about the second version of the communication type obtained from the communication type registry includes details of a format for the second version of the communication type and rules for implementing the second version of the communication type.

14. The method of claim 13, wherein the format and rules are obtained via a link posted by a communication owner of the communication type in the communication type registry.

15. A non-transitory machine-readable medium storing instructions which, when executed by one or more processors, cause the one or more processors to perform operations comprising:
   receiving, at a source application supporting a first version of a communication type, a notification from a communication type registry of a second version of the communication type;
   inserting branch code into the source application so that the source application supports the second version of the communication type in addition to supporting the first version of the communication type;
   determining that a first message needs to be sent;
   based on the determination and based on information received from the communication type registry, determining whether all of one or more recipient target applications of the first message have registered with the communication type registry as supporting the second version of the communication type; and
   in response a determination that all of the one or more recipient target applications of the first message have registered with the communication type registry as supporting the second version of the communication type, generating and sending the first message to all of the one or more recipient target applications in the second version of the communication type.

16. The non-transitory machine-readable medium of claim 15, wherein the operations further comprise:
   determining that a second message needs to be sent;
   based on the determination that the second message needs to be sent and based on information received from the communication type registry, determining whether all of one or more recipient target applications of the second message have registered with the communication type registry as supporting the second version of the communication type; and
   in response a determination that not all of the one or more recipient target applications of the second message have registered with the communication type registry as supporting the second version of the communication type, generating and sending the first message to all of the one or more recipient target applications in the first version of the communication type.

17. The non-transitory machine-readable medium of claim 15, wherein the information received from the communication type registry used in the determining whether all of one or more recipient target applications of the first message have registered with the communication type registry as supporting the second version of the communication type is obtained on a periodic basis by the source application.

18. The non-transitory machine-readable medium of claim 15, wherein the information received from the communication type registry used in the determining whether all of one or more recipient target applications of the first message have registered with the communication type registry as supporting the second version of the communication type is obtained after the determination that the first message needs to be sent.

19. The non-transitory machine-readable medium of claim 15, wherein the branch code is generated based on information about the second version of the communication type obtained from the communication type registry.

20. The non-transitory machine-readable medium of claim 19, wherein the information about the second version of the communication type obtained from the communication type registry includes details of a format for the second version of the communication type and rules for implementing the second version of the communication type.

\* \* \* \* \*